US008720296B2

(12) United States Patent
Yonehara et al.

(10) Patent No.: US 8,720,296 B2
(45) Date of Patent: May 13, 2014

(54) VERTICAL ARTICULATED ROBOT

(75) Inventors: Keisuke Yonehara, Kitakyushu (JP);
Takashi Sanada, Kitakyushu (JP);
Tomoyuki Shiraki, Kitakyushu (JP);
Ryuta Kagawa, Kitakyushu (JP);
Takashi Hatanaka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/590,117

(22) Filed: Aug. 20, 2012

(65) Prior Publication Data
US 2012/0312116 A1 Dec. 13, 2012

Related U.S. Application Data

(60) Division of application No. 12/720,677, filed on Mar. 10, 2010, now Pat. No. 8,266,979, which is a continuation of application No. PCT/JP2008/068627, filed on Oct. 15, 2008.

(30) Foreign Application Priority Data

Nov. 26, 2007 (JP) .................................. 2007-305001
Mar. 12, 2008 (JP) .................................. 2008-062522

(51) Int. Cl.
*B25J 18/04* (2006.01)
(52) U.S. Cl.
USPC ........................................ 74/490.02; 901/27
(58) Field of Classification Search
USPC .............................. 74/490.01–490.02; 901/27
See application file for complete search history.

(56) References Cited

U.S. PATENT DOCUMENTS

| 4,842,474 A | 6/1989 | Torii et al. |
| 4,991,456 A | 2/1991 | Shibata et al. |
| 5,305,652 A | 4/1994 | Zimmer |

(Continued)

FOREIGN PATENT DOCUMENTS

| JP | 61-192487 | 8/1986 |
| JP | 62-070913 | 4/1987 |

(Continued)

OTHER PUBLICATIONS

Japanese Office Action for corresponding JP Application No. 2009-543711, Aug. 21, 2012.

(Continued)

*Primary Examiner* — David M Fenstermacher
*Assistant Examiner* — Terence Boes
(74) *Attorney, Agent, or Firm* — Ditthavong Mori & Steiner, P.C.

(57) ABSTRACT

A vertical articulated robot includes a base, a turning base, a first upper arm, a second upper arm, a front arm, a wrist assembly, a first motor, a second motor, a third motor, a fourth motor, and a wire body. The wire body includes a first wire portion, a second wire portion, a third wire portion, a fourth wire portion, a fifth wire portion, and a sixth wire portion. The first wire portion extends from the turning base along a third rotation axis and is connected to an outer surface of the first upper arm. The second wire portion extends from the first wire portion along a plane perpendicular to the third rotation axis and is connected to an outer surface of the first upper arm. The third wire portion extends in a U-shape from the second wire portion.

11 Claims, 14 Drawing Sheets

(56) References Cited

U.S. PATENT DOCUMENTS

| | | | |
|---|---|---|---|
| 5,437,207 A * | 8/1995 | Zimmer | 74/490.02 |
| 5,577,414 A | 11/1996 | Ogawa et al. | |
| 6,250,174 B1 * | 6/2001 | Terada et al. | 74/490.02 |
| 7,322,258 B2 * | 1/2008 | Shiraki et al. | 74/490.05 |
| 8,266,979 B2 * | 9/2012 | Yonehara et al. | 74/490.03 |
| 2005/0016313 A1 | 1/2005 | Robertson et al. | |
| 2005/0126327 A1 * | 6/2005 | Markert et al. | 74/490.02 |
| 2006/0156852 A1 | 7/2006 | Haniya | |
| 2006/0179964 A1 | 8/2006 | Hama et al. | |
| 2008/0092689 A1 * | 4/2008 | Shiraki et al. | 74/490.02 |
| 2008/0264195 A1 * | 10/2008 | Larsson et al. | 74/490.02 |
| 2010/0313694 A1 * | 12/2010 | Aoki | 74/490.02 |
| 2011/0140330 A1 | 6/2011 | Nishikawa et al. | |
| 2012/0111135 A1 * | 5/2012 | Ichibangase et al. | 74/490.06 |

FOREIGN PATENT DOCUMENTS

| | | |
|---|---|---|
| JP | 62-277292 | 12/1987 |
| JP | 02-059281 | 2/1990 |
| JP | 02-097592 U | 8/1990 |
| JP | 02-298482 | 12/1990 |
| JP | 2585425 B2 | 12/1990 |
| JP | 05-504101 | 7/1993 |
| JP | 06-190769 | 7/1994 |
| JP | 07-256584 | 10/1995 |
| JP | 10-175188 | 6/1998 |
| JP | 2003-136444 | 5/2003 |
| WO | WO 2004/069493 | 8/2004 |

OTHER PUBLICATIONS

English translation of International Search Report for corresponding International Application No. PCT/JP2008/068627, Dec. 22, 2008.

Japanese Office Action for corresponding JP Application No. 2012-225457, Oct. 1, 2013.

* cited by examiner

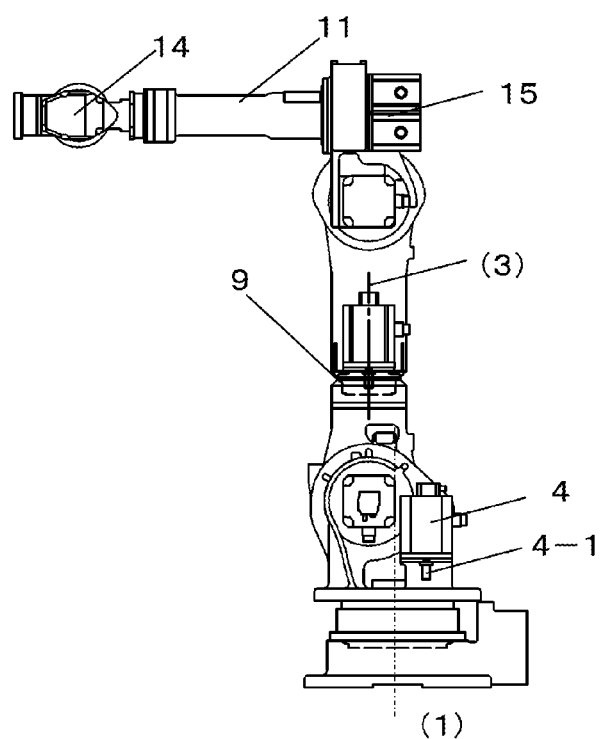
FIG1. A
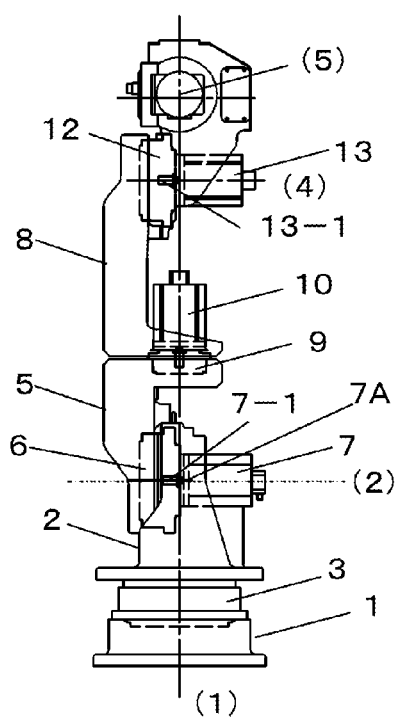
FIG1. B

VERTICAL ARTICULATED ROBOT

CROSS-REFERENCE TO RELATED APPLICATIONS

The present application is a divisional application of the U.S. patent application Ser. No. 12/720,677 filed Mar. 10, 2010, which in turn is a continuation application of PCT/JP2008/068627, filed Oct. 15, 2008, which claims priority to Japanese Patent Application No. 2007-305001, filed Nov. 26, 2007, and Japanese Patent Application No. 2008-062522, filed Mar. 12, 2008. The contents of these applications are incorporated herein by reference in their entirety.

BACKGROUND OF THE INVENTION

1. Field of the Invention

The present invention relates to a vertical articulated robot.

2. Discussion of the Background

As an example of a vertical articulated robot according to the related art, Japanese Unexamined Patent Application Publication No. 2-298482 discloses a seven-degree-of-freedom robot with which the problem of flexibility can be solved.

The seven-degree-of-freedom vertical articulated robot according to the related art is capable of avoiding interference with a workpiece or peripheral devices and interference between arms of the robot, and the operating area around the robot can be effectively utilized.

SUMMARY OF THE INVENTION

According to one aspect of the present invention, a vertical articulated robot includes a base, a turning base, a first upper arm, a second upper arm, a front arm, a wrist assembly, a first motor, a second motor, a third motor, a fourth motor, and a wire body. The turning base is provided on the base to be rotatable with respect to the base about a first rotation axis. The first upper arm is provided on the turning base to be rotatable with respect to the turning base about a second rotation axis provided along a plane perpendicular to the first rotation axis. The second upper arm is connected to the first upper arm to be rotatable with respect to the first upper arm about a third rotation axis provided along a plane perpendicular to the second rotation axis. The front arm is connected to the second upper arm to be rotatable with respect to the second upper arm about a fourth rotation axis provided along a plane perpendicular to the third rotation axis. The wrist assembly is connected to the front arm. The first motor is to rotate the turning base with respect to the first upper arm about the first rotation axis. The second motor is to rotate the first upper arm with respect to the turning base about the second rotation axis. The third motor is to rotate the second upper arm with respect to the first upper arm about the third rotation axis. The fourth motor is to rotate the front arm with respect to the second upper arm about the fourth rotation axis. The wire body includes a first wire portion, a second wire portion, a third wire portion, a fourth wire portion, a fifth wire portion, and a sixth wire portion. The first wire portion extends from the turning base along the third rotation axis and is connected to an outer surface of the first upper arm. The second wire portion extends from the first wire portion along a plane perpendicular to the third rotation axis and is connected to an outer surface of the first upper arm. The third wire portion extends in a U-shape from the second wire portion. The fourth wire portion extends from the third wire portion along a plane perpendicular to the third rotation axis and is connected to an outer surface of the second upper arm. The fifth wire portion extends from the fourth wire portion along the third rotation axis and is connected to an outer surface of the second upper arm. The sixth wire portion extends from the fifth wire portion and is connected to the front arm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a side view illustrating a first embodiment;

FIG. 1B is a front view illustrating the first embodiment;

DESCRIPTION OF THE EMBODIMENTS

Figure 2:
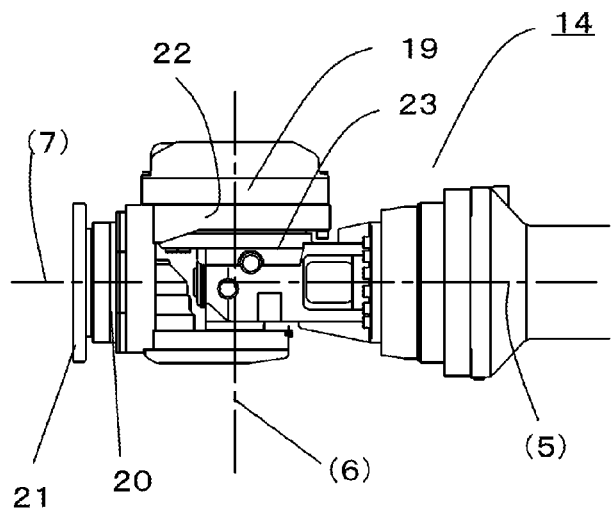
FIG. 2 is a top view illustrating a wrist assembly according to the first embodiment.

Embodiments will now be described with reference to the accompanying drawings, wherein like reference numerals designate corresponding or identical elements throughout the various drawings.

First Embodiment

FIGS. 1A and 1B are a side view and a front view, respectively, of a seven-degree-of-freedom vertical articulated robot according to an embodiment. In the figure, a first rotation axis (1) is perpendicular to the ground surface. A turning base 2 is provided with a turning drive motor 4 attached thereto, and an output shaft 4-1 of the turning drive motor 4 is connected to an input shaft of a reduction gear 3. The reduction gear 3 is a turning reduction gear and is supported by a robot base 1 and the turning base 2 such that the base 1 and the turning base 2 are relatively pivotable. The turning base 2 and the reduction gear 3 are arranged on the first rotation axis (1).

A drive motor 7 for a first upper arm 5 is arranged on a second rotation axis (2) in an opening provided in the above-described turning base 2. The second rotation axis (2) is in a plane perpendicular to the first rotation axis (1).

An output shaft 7-1 of the drive motor 7 for the first upper arm 5 is connected to an input shaft of a reduction gear 6 for the first upper arm 5. The reduction gear 6 for the first upper arm 5 is secured to both the opening in the turning base 2 and a side surface of the first upper arm 5, and is supported so as to be turnable about the second rotation axis (2).

The first upper arm 5 has an inverted L shape such that an L-shaped member is vertically inverted. An upper end portion of the first upper arm 5 supports a second upper arm 8 with a reduction gear 9 interposed therebetween. The reduction gear 9 is arranged on a third rotation axis (3) that is perpendicular to the second rotation axis (2) and that is on the same plate as the first rotation axis (1). The second upper arm 8 is supported so as to be turnable about the third rotation axis (3). With this structure, the drive motor 7 for the first upper arm 5 can be arranged such that the drive motor 7 does not protrude from the robot in the width direction thereof when viewed from the front. In the case where the robot is to perform an operation in an operating area that is distant from the robot, the length of the first upper arm 5 is determined on the basis of the distance to the operating area. In the case where the robot is to perform an operation in an operating area that is near the robot, the length of the first upper arm 5 is determined such that a motor unit 7A can be replaced without causing an interference between the motor unit 7A and the upper end portion of the first upper arm 5.

The second upper arm 8 has an L-shape that is symmetric to the shape of the first upper arm 5, so that a drive motor 10 for the second upper 8 arm can be attached to the second upper arm 8 on the third rotation axis (3). Thus, the drive motor 10 for turning the second upper arm 8 is attached to the second upper arm 8. Since the second upper arm 8 has an L-shape as described above, the drive motor 10 for the second upper arm 8 can be arranged such that the drive motor 10 does not protrude from robot in the width direction thereof when viewed from the front. An output shaft 10-1 of the drive motor 10 for turning the second upper arm 8 is connected to an input shaft of the reduction gear 9 for the first upper arm 8. The reduction gear 9 for the second upper arm 8 is secured to both the upper end portion of the first upper arm 5 and the bottom surface of the second upper arm 8, and is supported so as to be pivotable.

A fourth rotation axis (4) is perpendicular to and is on the same plane as the third rotation axis (3). A drive motor 13 and a reduction gear 12 for a front arm 11 are arranged on the fourth rotation axis (4).

A lower end portion of the front arm 11, which is positioned above the second upper arm 8, is rotatably supported in an upper opening in the second upper arm 8 with the reduction gear 12 provided between the front arm 11 and the second upper arm 8.

An output shaft 13-1 of the drive motor 13 for the front arm 11 is connected to an input shaft of the reduction gear 12 for the front arm 11. The reduction gear 12 for the front arm 11 is secured to both an opening in the front arm 11 and a side surface of the second upper arm 8, and is rotatably supported.

A fifth rotation axis (5) is in a plane that is perpendicular to the fourth rotation axis (4) and on which the third rotation axis (3) is arranged.

An attachment surface on which a drive motor 15 for rotating a wrist assembly 14 about the fifth rotation axis (5) is located at an end of the front arm 11 that is opposite to the wrist assembly 14. The drive motor 15 is connected to an input shaft of a reduction gear provided at an end face of the front arm 11 with a shaft and a gear or a pulley (not shown) provided therebetween. The reduction gear is secured to both the end face of the front arm 11 and an end portion of the wrist assembly 14, and is rotatably supported.

The wrist assembly 14 will be described in detail with reference to FIG. 2. The wrist assembly 14 includes a wrist base 23, a wrist 22, a flange 21, and reduction gears 19 and 20. An end portion of the wrist 22 is provided on and connected to a distal end portion of the wrist base 23 with the reduction gear 19 provided therebetween such that the wrist 22 is turnable about a sixth rotation axis (6) that is perpendicular to and is on the same plane as the fifth rotation axis (5). An end portion of the flange 21 is provided on and connected to a distal end portion of the wrist 22 with the reduction gear 20 provided therebetween such that the flange 21 is turnable about a seventh rotation axis (7) that is perpendicular to the sixth rotation axis (6). A drive motor (not shown) for the wrist 22 shown in FIG. 2 and a drive motor for the flange are connected to input shafts of the reduction gears 19 and 20, respectively, through shafts and gears or pulleys (not shown).

Figure 3:
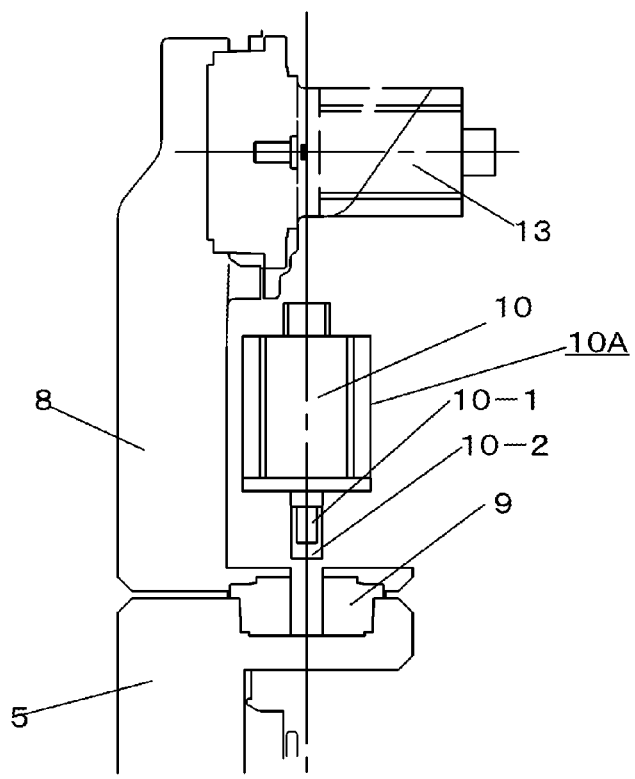
FIG. 3 is a sectional view of a second upper arm according to the first embodiment.

FIG. 3 shows the state in which the drive motor 10 for the second upper arm 8 is detached from the second upper arm 8 to replace the drive motor 10 with another motor. Referring to the figure, the output shaft 10-1 and an input gear 10-2 of the drive motor 10 are fastened to the drive motor 10 for the second upper arm 8 at an end thereof to form a motor unit 10A. An attachment surface of the drive motor 10 is arranged such that the motor unit 10A can be completely separated from the reduction gear 9 without causing an interference between with the front arm 11 or the front-arm drive motor 13 disposed at the bottom of the front arm 11. In the case where the robot is to perform an operation in an operating area that is distant from the robot, the length of the second upper arm 8 is determined on the basis of the distance to the operating area. In the case where the robot is to perform an operation in an operating area that is near the robot, the length of the second upper arm 8 is determined such that the motor unit 10A can be replaced without causing an interference between the motor unit 10A and the front-arm drive motor 13.

Thus, in the case where the robot is to perform an operation in an operating area that is near the robot, the lengths of the first upper arm and the second upper arm can be reduced so that the tool provided at a wrist axis can be brought closer to the robot. As a result, the robot can perform an operation in the area near the robot itself.

The displacements caused by the process of replacing the motor unit 10A can be corrected simply by making an adjustment so that the reduction gear 9 meshes with the input gear 10-2. Therefore, the correction can be performed in a short time. As described above, the drive motor 10 can be replaced simply by detaching the motor unit 10A, and no displacements of the joint axes of the robot occur. Therefore, the process of teaching the robot can be omitted and the manufacturing line can be restored in a short time.

Figure 4:
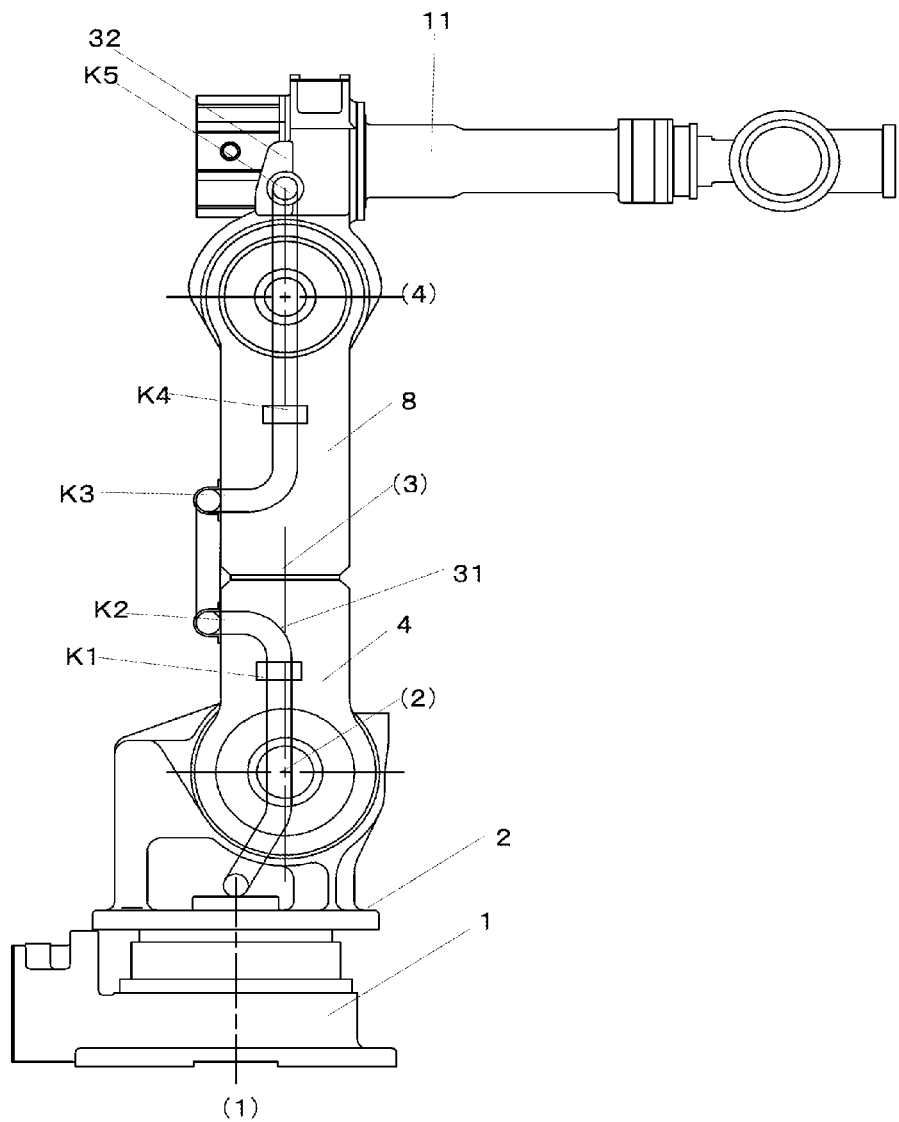
FIG. 4 is a side view illustrating the arrangement of a wire body according to the first embodiment.
Figure 5:
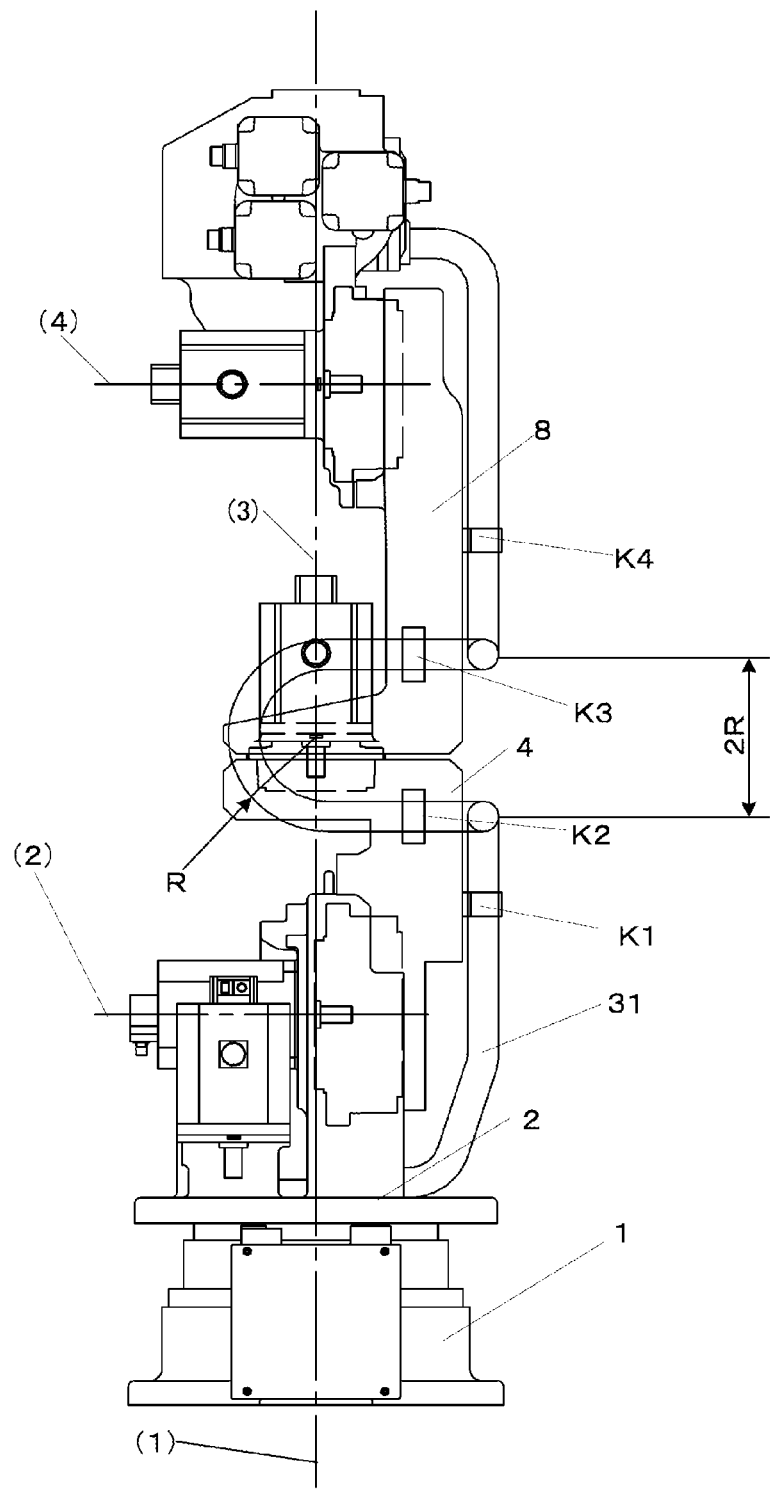
FIG. 5 is a rear view illustrating the arrangement of the wire body according to the first embodiment.

Next, the process of arranging a cable will be described with reference to FIGS. 4 and 5. A wire body 31 extends from the robot base 1 into the turning base 2, and is arranged so as to extend along a side surface of the first upper arm 5. The wire body 31 is fixed with a fixing clamp K1 to the side surface of the first upper arm 5 at a central position thereof, and is horizontally bent onto a rear surface of the first upper arm 5 such that a bending radius of the wire body 31 is at a minimum. The wire body 31 is fixed with a fixing clamp K2 to the rear surface of the first upper arm 5 at an upper end section thereof.

Then, the wire body 31 is vertically bent in a U-shape such that the wire body 31 extends along a side surface of the second upper arm 8, and is fixed with a fixing clamp K3 to the second upper arm 8 at a lower end section thereof. At this time, the wire body 31 is formed such that the width thereof is twice the bending radius of the wire body 31 when the bending radius is at a minimum.

Then, the wire body 31 is horizontally bent onto a side surface of the second upper arm 8 such that the bending radius of the wire body 31 is at a minimum, and is vertically bent along the side surface of the second upper arm 8 at a central section thereof. The wire body 31 is fixed with a fixing clamp K4 to the second upper arm 8 at a central position thereof, and is fixed with a fixing clamp K5 provided on a support 32 to the front arm 11 at a lower end section thereof. Then, the wire body 31 is inserted into the front arm 11.

In the case where the wire body 31 is arranged as described above, when the second upper arm 8 is turned about the third rotation axis (3), the wire body 31 moves between the fixing clamp K2 at the upper end section of the first upper arm 5 and the fixing clamp K3 at the lower end section of the second upper arm 8. Assuming that the movable range of the second upper arm 8 is from +90 degrees to −90 degrees, the wire body 31 that is fixed in the above-described manner does not protrude outward or become slack by an excessive amount in the operation of the robot. This will be described with reference to FIGS. 6 and 7.

Figure 6:
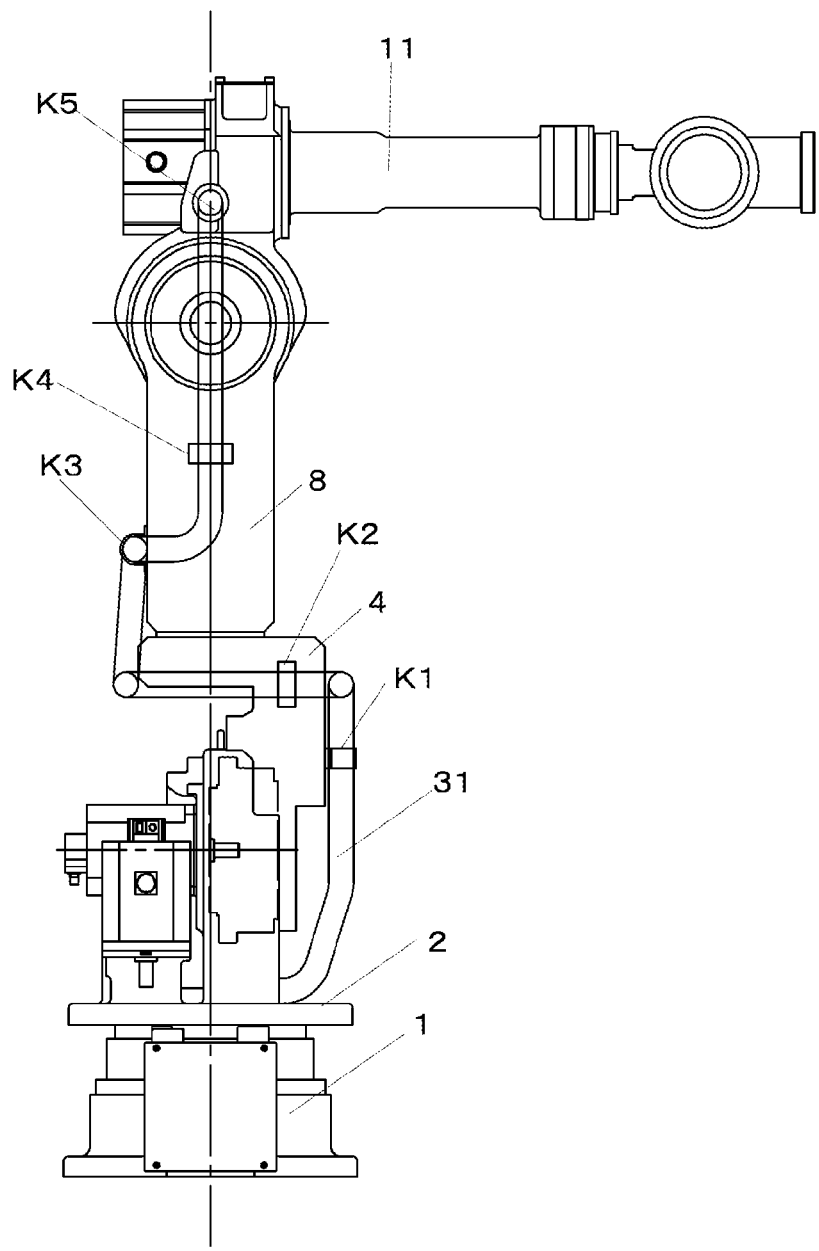
FIG. 6 is a side view illustrating the arrangement of the wire body according to the first embodiment in the state in which the second upper arm is turned about a third rotation axis by 90 degrees.
Figure 7:
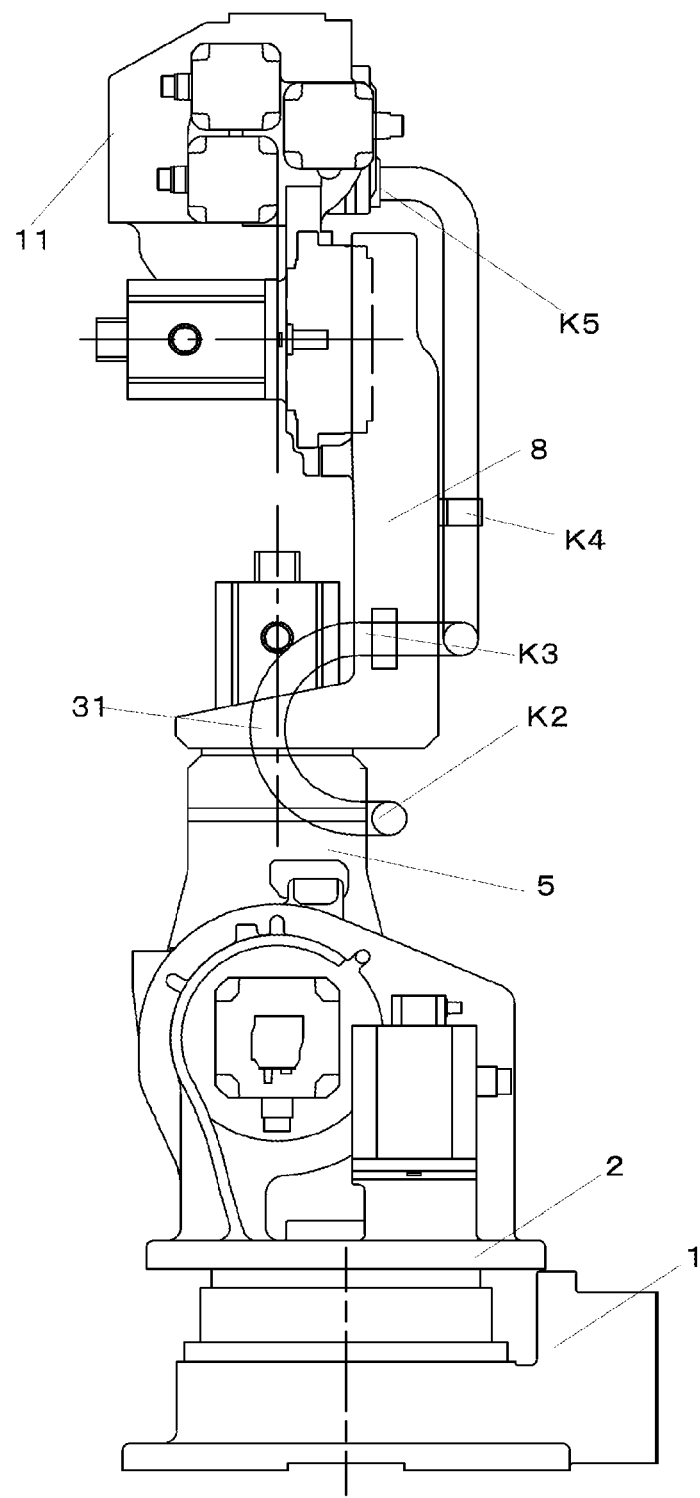
FIG. 7 is a rear view illustrating the arrangement of the wire body according to the first embodiment in the state in which the second upper arm is turned about the third rotation axis by 90 degrees.

FIGS. 6 and 7 are a side view and a rear view, respectively, of the robot in the state in which the second upper arm 8 is turned by 90°. In FIGS. 6 and 7, when the second upper arm 8 is turned, the wire body 31 is fixed with the fixing clamp K2 provided at the upper end section of the first upper arm 5 and the fixing clamp K3 provided at the lower end section of the second upper arm 8 such that the wire body 31 is bent so as to extend between the fixing clamp K2 and the fixing clamp K3 along the outer peripheral surfaces of the arms while the width of the wire body 31 is maintained at twice the bending radius of the wire body 31. Since the wire body 31 is fixed so as to extend along the peripheral surfaces of the arms, the amount by which the wire body 31 protrudes outward can be reduced. As a result, the risk that the wire body 31 will protrude outward and interfere with a peripheral device or the robot itself can be reduced.

Figure 8:
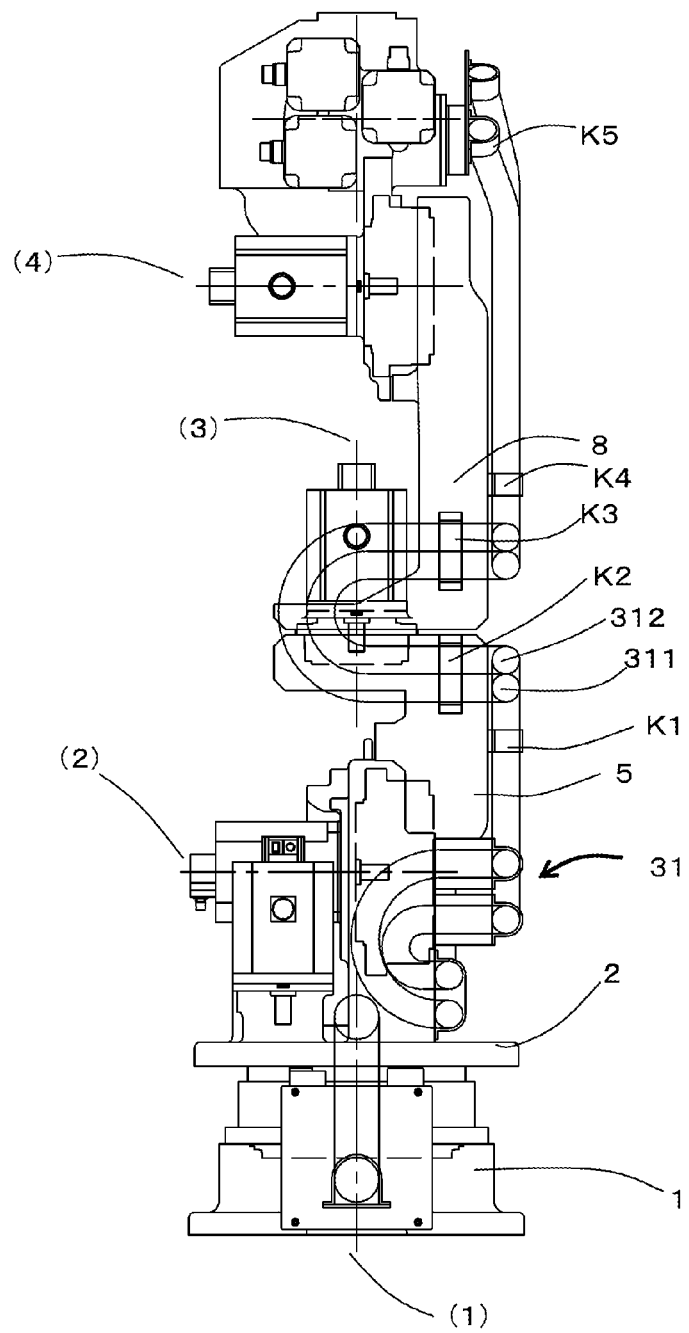
FIG. 8 is a rear view illustrating the arrangement of wire bodies according to the first embodiment.
Figure 9:
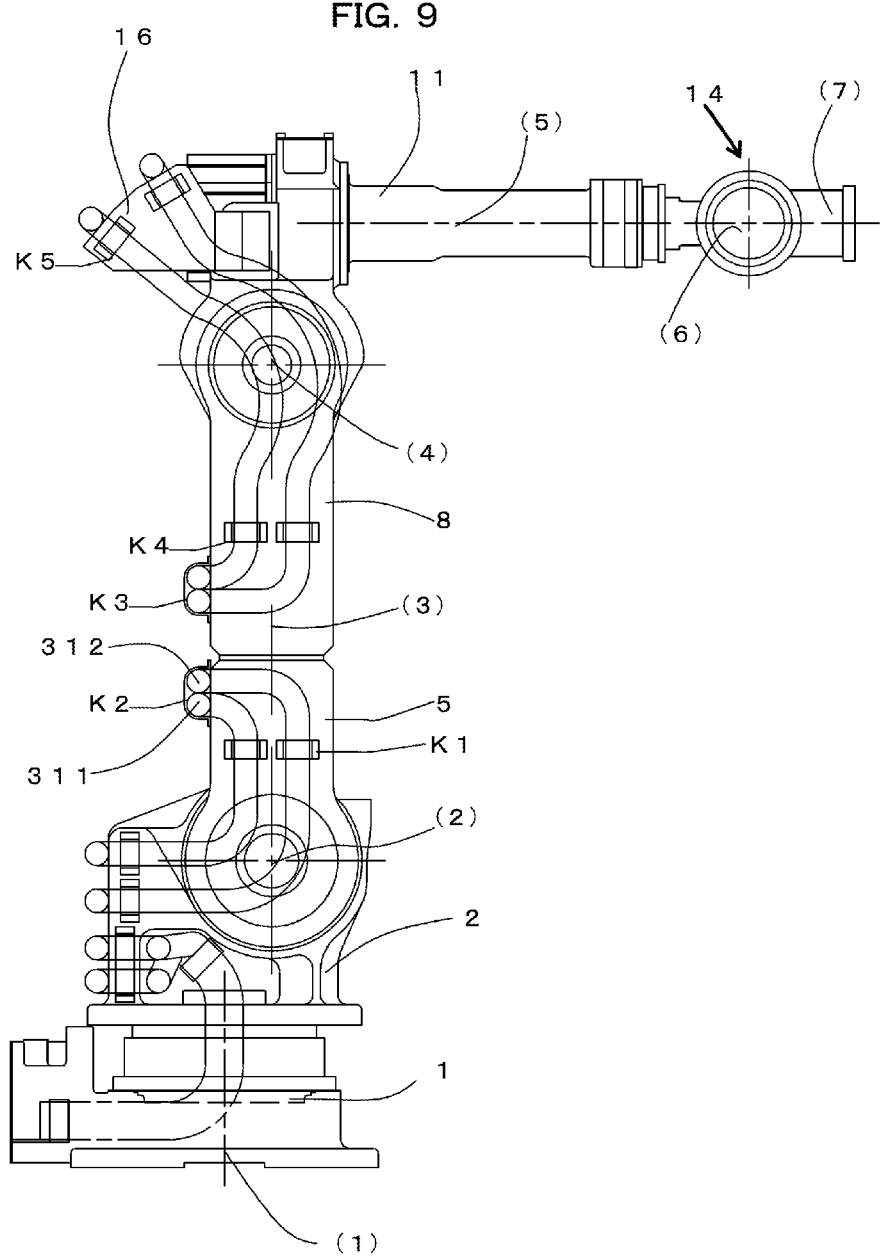
FIG. 9 is a side view illustrating the arrangement of the wire bodies according to the first embodiment.

Although the arrangement of a single wire body is described in the above-described embodiment, two or more wire bodies may also be provided. A case in which two wire bodies are arranged will now be described with reference to FIGS. 8 and 9. Reference numeral 31 denotes both a wire body for the robot and another wire body, such as a hose of cooling water or a cable for supplying electricity to the drive motors for the respective axes of the robot or a drive motor for a gun or the like (not shown) attached to a distal end portion of the robot.

The wire bodies 31 are fixed to the turning base 2 at an exit section thereof. The wire bodies 31 are arranged so as to extend to a rear section of the turning base 2 and are then bent in a U-shape so that a large bending radius can be obtained during the rotation about the second rotation axis (2). Then, the wire bodies 31 are fixed to a side surface of the turning base 2 at positions separated from the rotation center at the second rotation axis (2). The wire bodies 31 fixed to the side surface of the turning base 2 are arranged so as to extend through an area around the rotation center at the second rotation axis (2) and are fixed with fixing clamps K1 to a side surface of the first upper arm 5 such that the wire bodies 31 extend along the longitudinal direction of the first upper arm 5. Then, the wire bodies 31 are fixed with fixing clamps K2 to a rear section of the first upper arm 5 at the upper end section thereof. The wire bodies 31 fixed to the rear section of the first upper arm 5 are bent in a U-shape and are fixed with fixing clamps K3 to a rear section of the second upper arm 8 at the lower end section thereof. Then, the wire bodies 31 are fixed with fixing clamps K4 to a side surface of the second upper arm 8 such that the wire bodies 31 extend along the longitudinal direction of the second upper arm 8. The wire bodies 31 fixed to the side surface of the second upper arm 8 are arranged so as to extend through an area around the fourth rotation axis (4) and are fixed with fixing clamps K5 to a support 16 which protrudes rearward from a base portion of the front arm 11.

In consideration of the ease of maintenance, at least two wire bodies 31 are provided. The two wire bodies 31 include a robot wire body 311 necessary for driving the robot and a tool wire body 312 necessary for a gun or the like that is attached to an end portion of the robot.

According to the embodiment, to reduce the width of robots so that the robots can be densely arranged, the tool wire body 312 is disposed on either the outer side or the inner side of the robot wire body 311 at movable sections of the robot. The method for arranging the wire bodies will now be described.

Movements of the wire bodies 31 during the rotation about the fourth rotation axis (4) will be described with reference to FIGS. 10 and 11. Movements during the rotation about the second rotation axis (2) are the same as those in the rotation about the fourth rotation axis, and explanations thereof are thus omitted.

Figure 10:
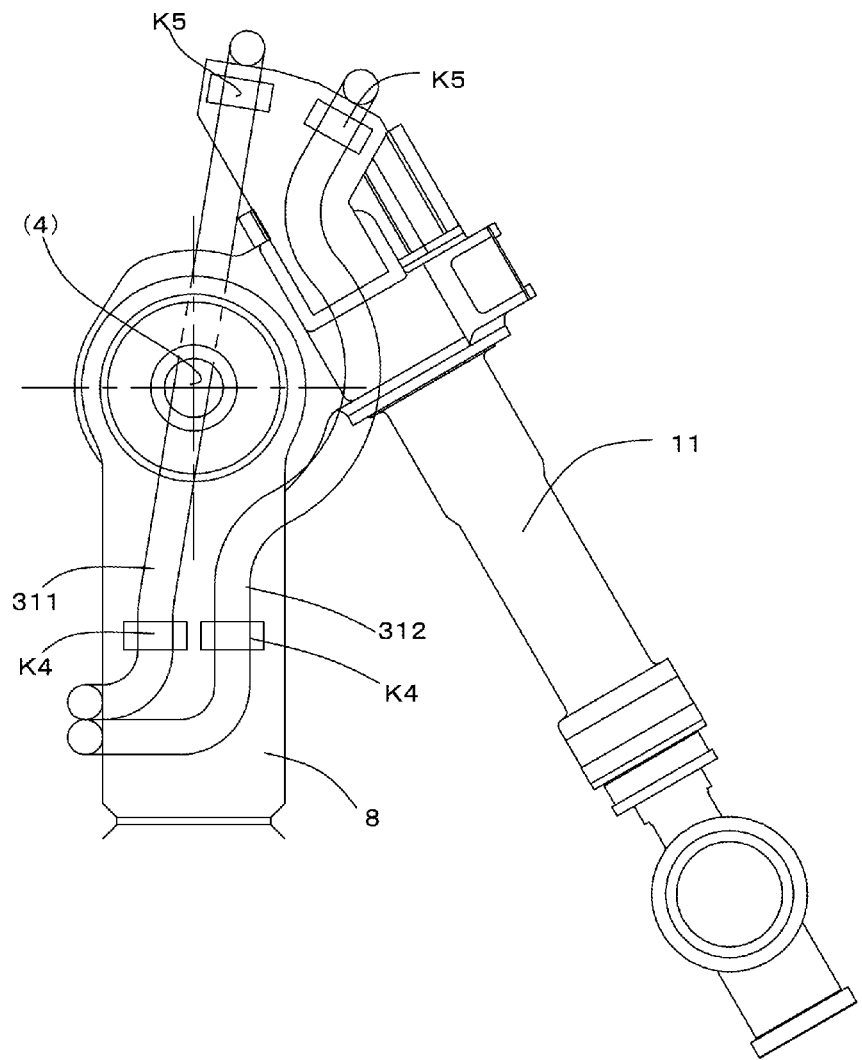
FIG. 10 is a side view illustrating the arrangement of the wire bodies according to the first embodiment in the state in which a front arm is tilted downward.
Figure 11:
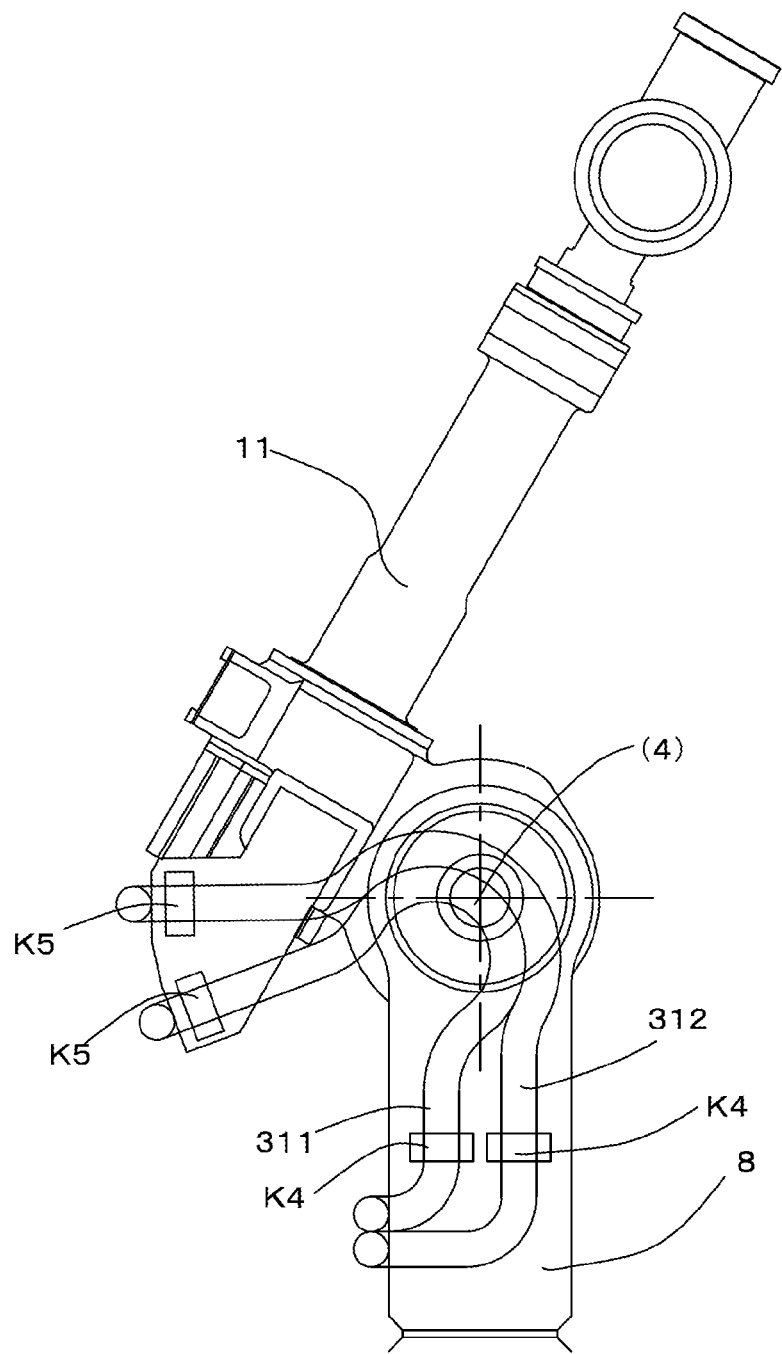
FIG. 11 is a side view illustrating the arrangement of the wire bodies according to the first embodiment in the state in which the front arm is tilted upward.

FIG. 10 shows the state in which the front arm 11 is tilted downward by a maximum amount, and FIG. 11 shows the state in which the front arm 11 is tilted upward by a maximum amount.

The fixing clamp K5 for the robot wire body 311 is positioned such that the robot wire body 311 extends linearly in the state shown in FIG. 10. Therefore, the wire bodies 31 are bent only in one direction instead of being bent in opposite directions. The length of the wire body 31 between the fixing clamp K4 and the fixing clamp K5 for the robot wire body 311 is determined by the linear length of the robot wire body 311 as shown in FIG. 10, so that there is no loss in the length of the robot wire body 311.

The position and the length of the wire body 31 between the fixing clamp K4 and the fixing clamp K5 for the tool wire body 312 is set such that the tool wire body 312 does not come into contact with the robot wire body 311 and receive a force, such as a compressive force or a tensile force, when the front arm 11 rotates about the fourth rotation axis (4). The tool wire body 312 is fixed by the fixing clamp K5 at a position separated from the robot wire body 311 to prevent a contact therewith. More specifically, the tool wire body 312 is fixed by the fixing clamp K5 at a position separated from the robot wire body 311 by an amount corresponding to the curvature R obtained when the robot wire body 311 is bent as shown in FIG. 11. In addition, the length of the tool wire body 312 between the fixed points thereof is set such that the tool wire body 312 can extend along the outer side of the robot wire body 311 without applying a force to the robot wire body 311 in the state shown in FIG. 11. In such a case, the robot wire body 311 and the tool wire body 312 are prevented from receiving an excessive force, and breakage thereof can be prevented. However, since the tool wire body 312 is longer than the robot wire body 311, the tool wire body 312 becomes slack in the state shown in FIG. 10. Therefore, to prevent breakage due to a local bending caused by an excessive slack, the length of the tool wire body 312 is set in accordance with the movable angle range of the front arm 11 around the fourth rotation axis (4).

Movements of the cables during the rotation about the third rotation axis (3) will be described with reference to FIGS. 12, 13, 14, and 15.

It is assumed that the movable ranges of the second upper arm 8 around the third rotation axis (3) is ±90 degrees.

Figure 12:
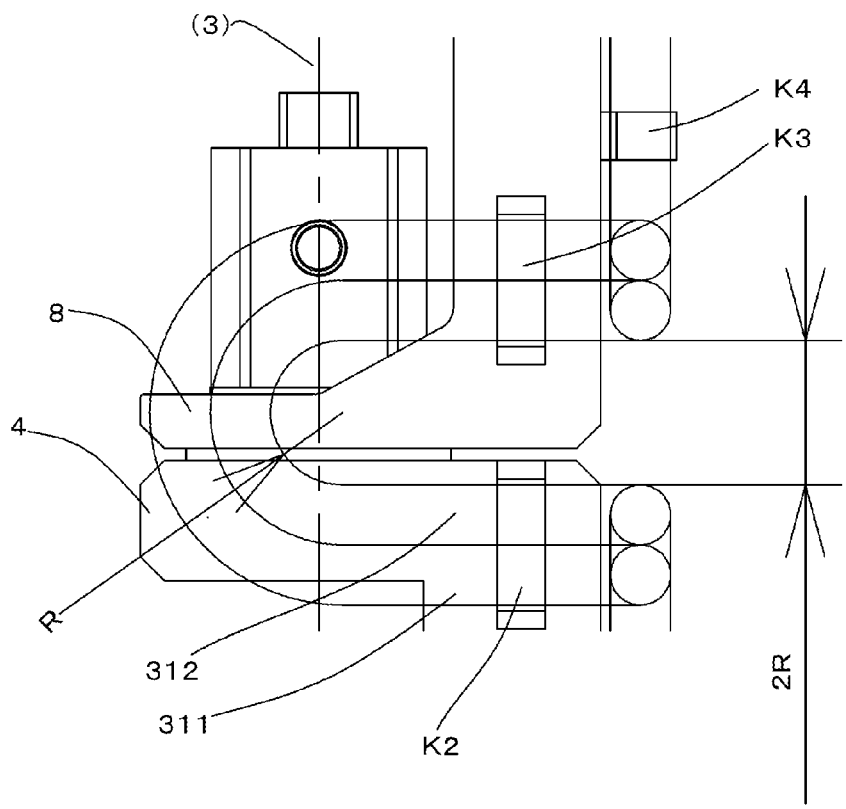
FIG. 12 is a side view illustrating the arrangement of the wire body according to the first embodiment in the state in which the second upper arm is turned about the third rotation axis by 0 degrees.
Figure 13:
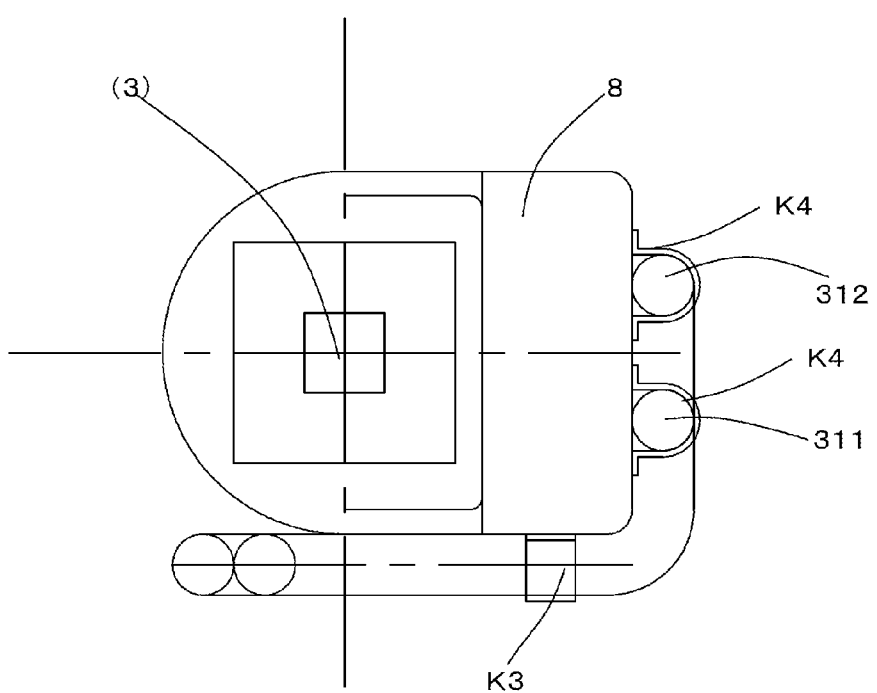
FIG. 13 is a top view illustrating the arrangement of the wire body according to the first embodiment in the state in which the second upper arm is turned about the third rotation axis by 0 degrees.
Figure 14:
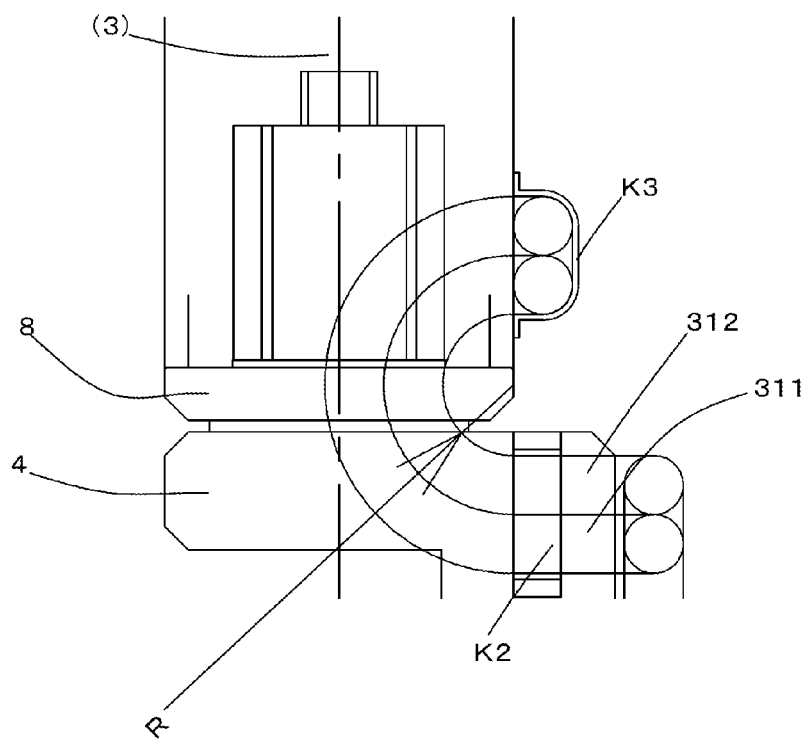
FIG. 14 is a side view illustrating the arrangement of the wire bodies according to the first embodiment in the state in which the second upper arm is turned about the third rotation axis by 90 degrees.
Figure 15:
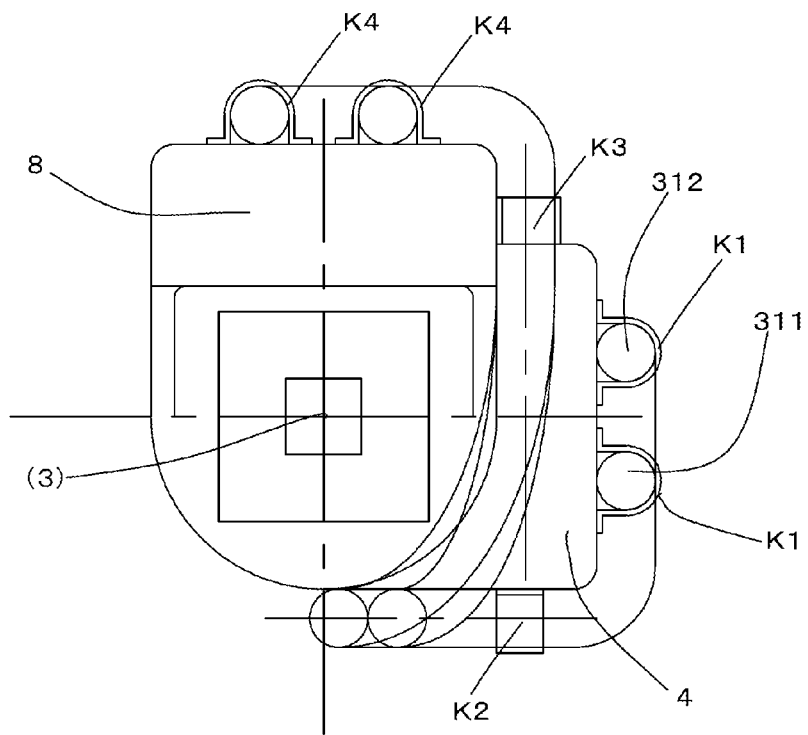
FIG. 15 is a top view illustrating the arrangement of the wire bodies according to the first embodiment in the state in which the second upper arm is turned about the third rotation axis by 90 degrees.

FIGS. 12 and 13 are a side view and a top view, respectively, in the case where the rotational angle is 0 degrees. FIGS. 14 and 15 are a side view and a top view, respectively, in the case where the rotational angle is 90 degrees.

The position at which the tool wire body 312 is fixed to the second upper arm 8 by the fixing clamp K3 is directly above the fixing clamp K2 on the first upper arm 5 in the state shown in FIG. 12. The height of the fixing clamp K3 is set such that the wire body 31 can be bent at a minimum bending radius. More specifically, the vertical distance between the fixing clamp K2 and the fixing clamp K3 for the tool wire body 312 is twice the cable bending radius. The length of the tool wire body 312 between the fixing clamp K2 and the fixing clamp K3 is set such that the bending radius is prevented from being reduced to below the minimum bending radius of the wire body 31 at the fixing clamp K2 on the first upper arm 5 when the rotational angle around the third rotation axis (3) is 90 degrees as shown n FIG. 14.

In the states shown in FIGS. 12 and 13, the robot wire body 311 is fixed to the first upper arm 5 at a position directly below the tool wire body 312, and is fixed to the second upper arm 8 at a position directly above the tool wire body 312. The length of the robot wire body 311 between the fixing clamp K2 and the fixing clamp K4 is determined such that the robot wire body 311 extends along the tool wire body 312 without applying a compressive force to the tool wire body 312.

Since the movable range is about ±90 degrees and the lengths of the U-shaped portions of the cables are not long, the cables can be prevented from protruding or becoming slack by a large amount.

According to the present embodiment, the movable range of the second upper arm around the third rotation axis (3) is assumed to be ±90 degrees. However, the movable range may, of course, also be wider or narrower than the above-described range. In such a case, the lengths of the wire bodies at the movable sections are adjusted in accordance with the movable range.

Second Embodiment

Figure 16:
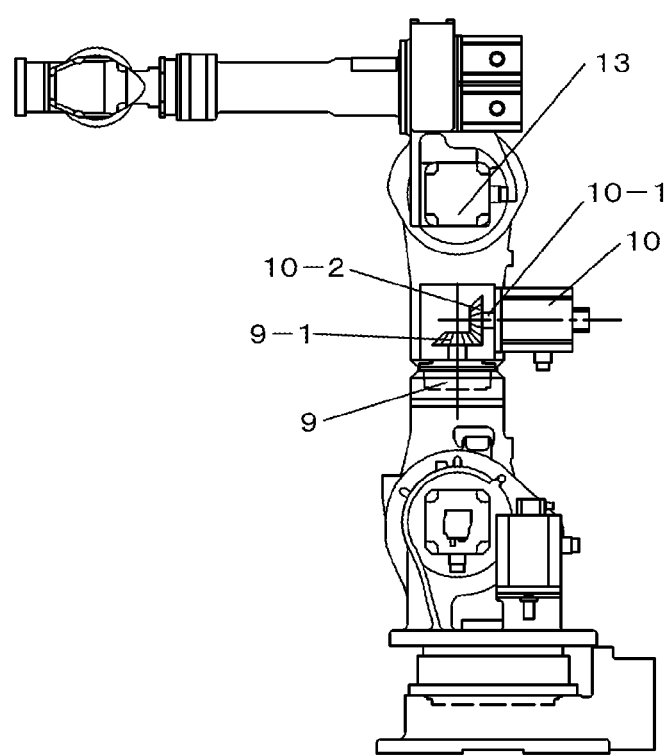
FIG. 16 is a side view illustrating a second embodiment.

A difference between a second embodiment shown in FIG. 16 and the first embodiment will be described with reference to FIG. 16.

The drive motor 10 for driving the second upper arm 8 is inclined by 90° with respect to the third rotation axis (3) and is attached to a rear surface of the robot. A driving force of a drive motor 10 is transmitted to a reduction gear 9 through a gear 10-2 attached to an end portion of an output shaft 10-1 and a gear 9-1 attached to an input shaft of the reduction gear 9. The rotation of the drive motor 10 is transmitted to the reduction gear 9 through the gear 10-2, which is a bevel gear, of the drive motor 10 and the input gear 9-1, which is also a bevel gear, of the reduction gear 9 that is integrated with the second upper arm 8. Accordingly, the second upper arm 8 is rotated to a predetermined angle.

In the case where the robot is to perform an operation in an operating area that is distant from the robot, the length of the second upper arm 8 is determined on the basis of the distance to the operating area. In the case where the robot is to perform an operation in an operating area that is near the robot, the length of the second upper arm 8 is determined such that the drive motor 10 can be replaced without causing an interference between the drive motor 10 and the front-arm drive motor 13.

Accordingly, in the case where the robot is to perform an operation in a narrow operating area, the length of the second upper arm 8 can be reduced. As a result, the height of the robot from the ground surface can be reduced compared to that of the robot according to the first embodiment. In other words, the lengths of the first upper arm and the second upper arm can be reduced to bring the tool provided at the wrist axis closer to the robot. As a result, the robot can perform the operation in an area closer to the robot itself. In addition, similar to the first embodiment, the displacements caused by the process of replacing the drive motor 10 can be corrected simply by making an adjustment so that the input gear 9-1 of the reduction gear 9 meshes with the gear 10-2 of the drive motor 10. Thus, the correction can be performed in a short time. As described above, the motor replacing process can be performed simply by detaching the drive motor 10, and no displacements of the joint axes of the robot occur. Therefore, the process of teaching the robot can be omitted and the manufacturing line can be restored in a short time.

Third Embodiment

A difference between a third embodiment shown in FIGS. 17A and 17B and the first embodiment will be described with reference to FIGS. 17A and 17B.

Figure 17A:
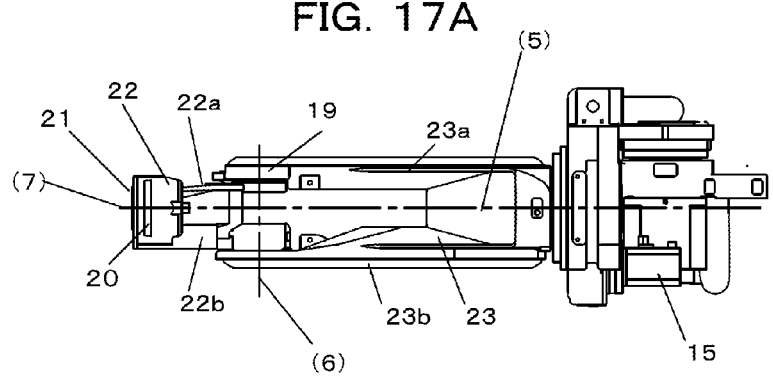
FIG. 17A is a side view illustrating a third embodiment.
Figure 17B:
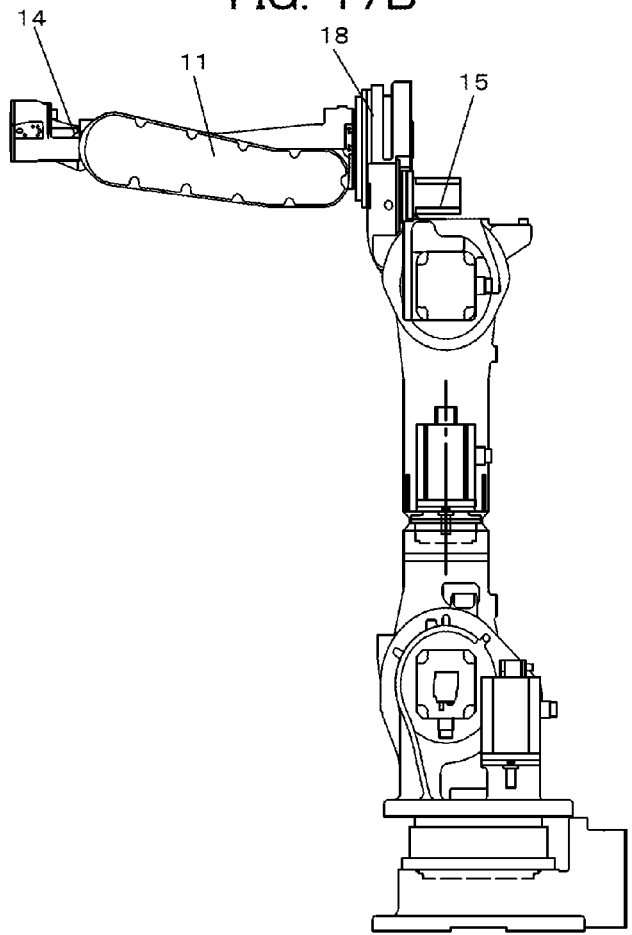
FIG. 17B is a top view illustrating the third embodiment.

FIGS. 17A and 17B are a top view and a side view, respectively.

An attachment surface on which a drive motor 15 for rotating a wrist assembly 14 about a fifth rotation axis (5) is located at an end of a front arm 11 that is opposite to the wrist assembly 14. The drive motor 15 is connected to an input shaft of a reduction gear 18 that is provided at an end face of the front arm 11 with a shaft and a gear or a pulley (not shown) provided therebetween. The reduction gear 18 is provided with a hole through which a cable can be inserted. The reduction gear 18 is secured to both the end face of the front arm 11 and an end portion of the wrist assembly 14, and is rotatably supported.

The wrist assembly 14 will be described in detail with reference to FIG. 17A. The wrist assembly 14 includes a wrist base 23, a wrist 22, a flange 21, and reduction gears 19 and 20. The wrist base 23 includes two members 23a and 23b and has a shape of a substantially U-shaped fork. A space through which a cable extends is provided between the two members. An end portion of the wrist 22 is provided on and connected to a distal end portion of the wrist base 23 with the reduction gear 19 provided therebetween such that the wrist 22 is turnable about a sixth rotation axis (6) that is perpendicular to and is on the same plane as the fifth rotation axis (5). The wrist 22 includes two members 22a and 22b that extend parallel to a seventh rotation axis (7), and has a shape of a two-tined fork such that a space through which a cable extends is provided between the two members. An end portion of the flange 21 is provided on and connected to a distal end portion of the wrist 22 with the reduction gear 20 provided therebetween such that the flange 21 is turnable about the seventh rotation axis (7) that is perpendicular to the sixth rotation axis (6). A drive motor for the wrist 22 and a drive motor for the flange (not shown) are connected to input shafts of the reduction gears 19 and 20, respectively, through shafts and gears or pulleys (not shown).

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A vertical articulated robot comprising:
   a base;
   a turning base provided on the base to be rotatable with respect to the base about a first rotation axis;
   a first upper arm provided on the turning base to be rotatable with respect to the turning base about a second rotation axis provided along a plane perpendicular to the first rotation axis;
   a second upper arm connected to the first upper arm to be rotatable with respect to the first upper arm about a third rotation axis provided along a plane perpendicular to the second rotation axis;
   a front arm connected to the second upper arm to be rotatable with respect to the second upper arm about a fourth rotation axis provided along a plane perpendicular to the third rotation axis;
   a wrist assembly connected to the front arm;
   a first motor to rotate the turning base with respect to the first upper arm about the first rotation axis;
   a second motor to rotate the first upper arm with respect to the turning base about the second rotation axis;
   a third motor to rotate the second upper arm with respect to the first upper arm about the third rotation axis;
   a fourth motor to rotate the front arm with respect to the second upper arm about the fourth rotation axis; and
   a wire body comprising:
      a first wire portion extending from the turning base along the third rotation axis and connected to an outer surface of the first upper arm;
      a second wire portion extending from the first wire portion along a plane perpendicular to the third rotation axis and connected to an outer surface of the first upper arm;
      a third wire portion extending in a U-shape from the second wire portion;
      a fourth wire portion extending from the third wire portion along a plane perpendicular to the third rotation axis and connected to an outer surface of the second upper arm;
      a fifth wire portion extending from the fourth wire portion along the third rotation axis and connected to an outer surface of the second upper arm; and
      a sixth wire portion extending from the fifth wire portion and connected to the front arm.

2. The vertical articulated robot according to claim 1, wherein the third wire portion extending in a U-shape from the second wire portion along a plane is parallel to the third rotation axis.

3. The vertical articulated robot according to claim 1, wherein at least part of the first wire portion overlaps the third rotation axis when viewed from a direction along the second rotation axis.

4. The vertical articulated robot according to claim 1, wherein at least part of the fifth wire portion overlaps the third rotation axis when viewed from a direction along the fourth rotation axis.

5. The vertical articulated robot according to claim 1,
   wherein the first upper arm includes a first end portion and a second end portion,
   wherein the first end portion of the first upper arm is connected to the turning base to be rotatable with respect to the turning base about the second rotation axis,
   wherein the second end portion of the first upper arm supports the second upper arm to be rotatable with respect to the second end portion of the first upper arm about the third rotation axis, and
   wherein the second wire portion is connected to the second end portion of the first upper arm.

6. The vertical articulated robot according to claim 1,
   wherein the second upper arm includes a first end portion and a second end portion,
   wherein the first end portion of the second upper arm is connected to the first upper arm to be rotatable with respect to the first upper arm about the third rotation axis,
   wherein the second end portion of the second upper arm supports the front arm to be rotatable with respect to the second end portion of the second upper arm about the fourth rotation axis, and
   wherein the fourth wire portion is connected to the first end portion of the second upper arm.

7. The vertical articulated robot according to claim 1,
   wherein the first upper arm includes a first outer surface and a second outer surface,
   wherein the first outer surface faces in a direction along the second rotation axis,
   wherein the second outer surface is provided along the second rotation axis and the third rotation axis,
   wherein the first wire portion is connected to the first outer surface of the first upper arm, and
   wherein the second wire portion is connected to the second outer surface of the first upper arm.

8. The vertical articulated robot according to claim 1,
   wherein the first upper arm includes a first long-side member and a first short-side member,
   wherein the first long-side member is provided on the turning base to be rotatable with respect to the turning base about the second rotation axis and extends along the third rotation axis,
   wherein the first short-side member extends from the first long-side member along a plane perpendicular to the third rotation axis, and
   wherein the first wire portion is connected to the first long-side member.

9. The vertical articulated robot according to claim 8,
   wherein the second wire portion is connected to the first long-side member.

10. The vertical articulated robot according to claim 8,
    wherein the second upper arm includes a second long-side member and a second short-side member,
    wherein the second long-side member supports the front arm to be rotatable with respect to the second long-side member about the fourth rotation axis and extends along the third rotation axis,
    wherein the second short-side member extends from the second long-side member along a plane perpendicular to the third rotation axis, the second short-side member being rotatably connected to the first short-side member about the third rotation axis, and wherein the fifth wire portion is connected to the second long-side member.

11. The vertical articulated robot according to claim 10, wherein the fourth wire portion is connected to the second long-side member.

* * * * *